UNITED STATES PATENT OFFICE.

LOUIS BASTET, OF PHILADELPHIA, PENNSYLVANIA, ASSIGNOR TO ELIHU R. PETTIT, OF SAME PLACE.

IMPROVEMENT IN SOLUTIONS FOR GALVANIC BATTERIES.

Specification forming part of Letters Patent No. 185,160, dated December 12, 1876; application filed August 30, 1876.

*To all whom it may concern:*

Be it known that I, LOUIS BASTET, of Philadelphia, in the county of Philadelphia and State of Pennsylvania, have invented a certain new and useful Compound for Generating Electricity for Electro-Motive Force for Propelling Electro-Magnetic Engines, or for other purposes, which compound is fully described in the following specification:

To prepare this compound take nitric acid having the strength of about 42° Baumé, to each pound of which add three ounces of bichromate of potassa—the Scotch being the best for this purpose—and stir it thoroughly in a warm room twice each day for eight or ten days, according to the temperature of the room. By this means a mutual decomposition and recomposition take place, whereby (among other results) nitro-chromic acid is formed, and is the active agent desired in this compound, by the use of which the intensity and durability of the battery are greatly increased and prolonged.

By the decomposition in part of the nitric acid, some of the nitrogen is set free, and when the battery is charged, as hereinafter described, but the circuit broken, this free nitrogen will combine with the free oxygen in the water, and neutralize it or prevent its combination with the zinc. By this means, the sulphuric acid in the fluid of the battery being also prevented from acting upon the zinc, (the oxide of zinc not being formed, as mentioned above,) all local action is prevented, or so nearly so that it is neither necessary nor desirable to remove the zincs from the solution when the circuit is broken.

The object of having so large a quantity of bichromate of potassa in the solution is, that the nitric acid may become thoroughly saturated with it, as without this saturation the chemical changes referred to will not take place. This saturation is insured by the addition of an excess of the bichromate of potassa.

It is absolutely necessary that the nitric acid be of the proper strength, as specified, for if it be diluted its complete saturation is prevented, and the chemical changes mentioned will not occur. As these chemical changes take place but slowly, the agitation by stirring and the lapse of a certain time are also all-important and essential concomitants in the manufacture of this compound.

In charging a battery—as, for instance, a Bunsen battery—I use sulphuric acid and water in both the porous cup and the outer jar, in varying proportions, according to the purposes to which it is to be applied, but usually having a strength of about 45° Baumé in the porous cup, and 8° or 10° Baumé in the outer cell, at the time the battery is charged.

To the fluid in each porous cup, to obtain the best results, I add my compound above described, in the proportion of one ounce of the compound to one pound of the acid of the strength of 45° Baumé.

Having thus described my invention, what I claim as new, and desire to secure by Letters Patent, is—

1. The compound resulting from dissolving bichromate of potassa in nitric acid, in the manner described, so as to produce the saturation of the latter by the former, by which saturation, and the resulting decomposition and recomposition, nitro-chromic acid is formed in an economical manner.

2. The application of the compound, in the proportion of about one ounce of the compound to one pound of sulphuric acid of the strength of 45° Baumé, in each porous cup of a galvanic battery, for the purpose of increasing and prolonging the intensity and durability of the battery, and preventing or retarding local action when the circuit is broken.

LOUIS BASTET.

Witnesses:
THOS. COOPER,
EDWARD B. COOPER.